(No Model.) 6 Sheets—Sheet 1.
J. W. MEAKER.
FARE REGISTER.
No. 347,437. Patented Aug. 17, 1886.
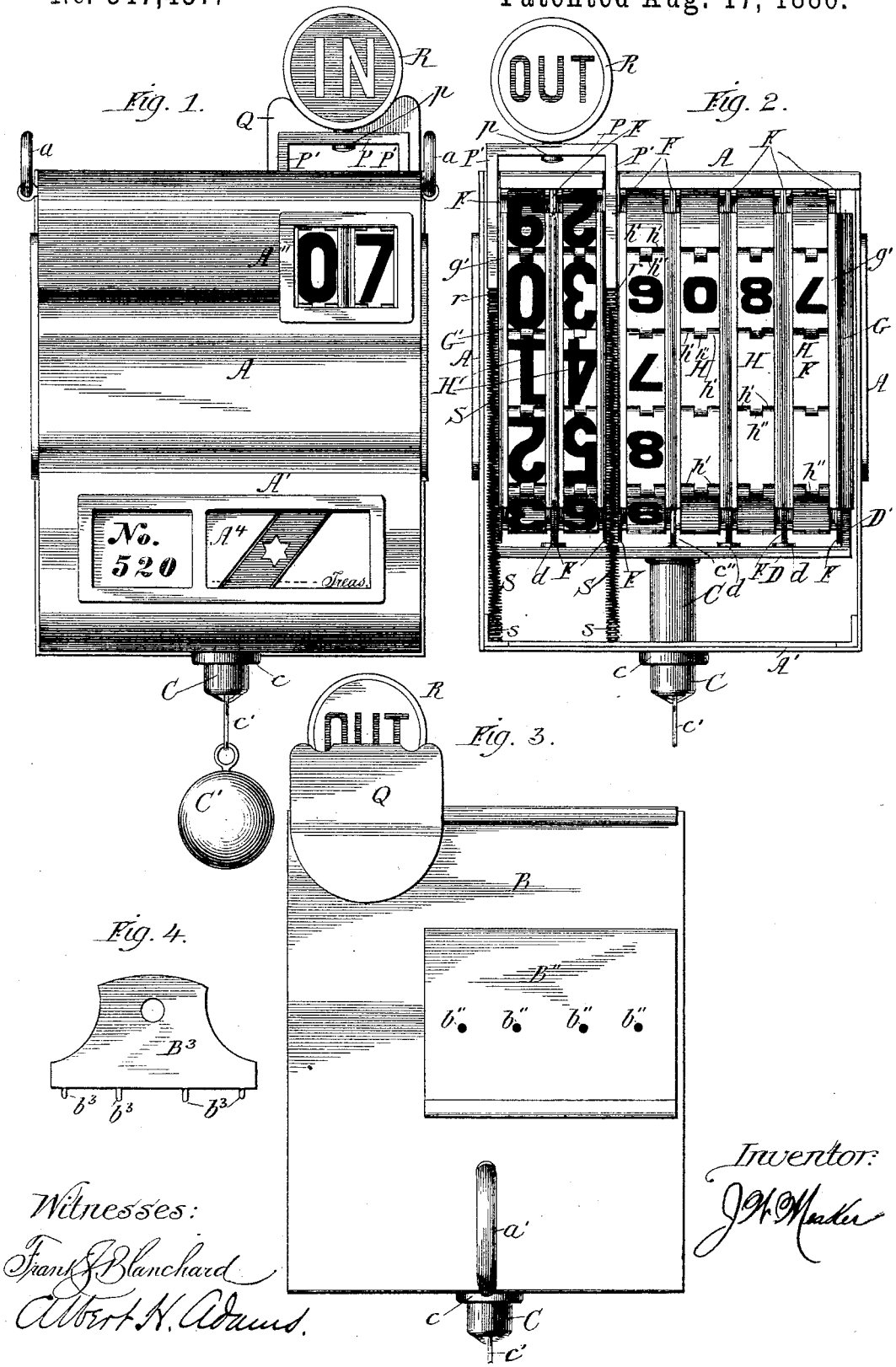

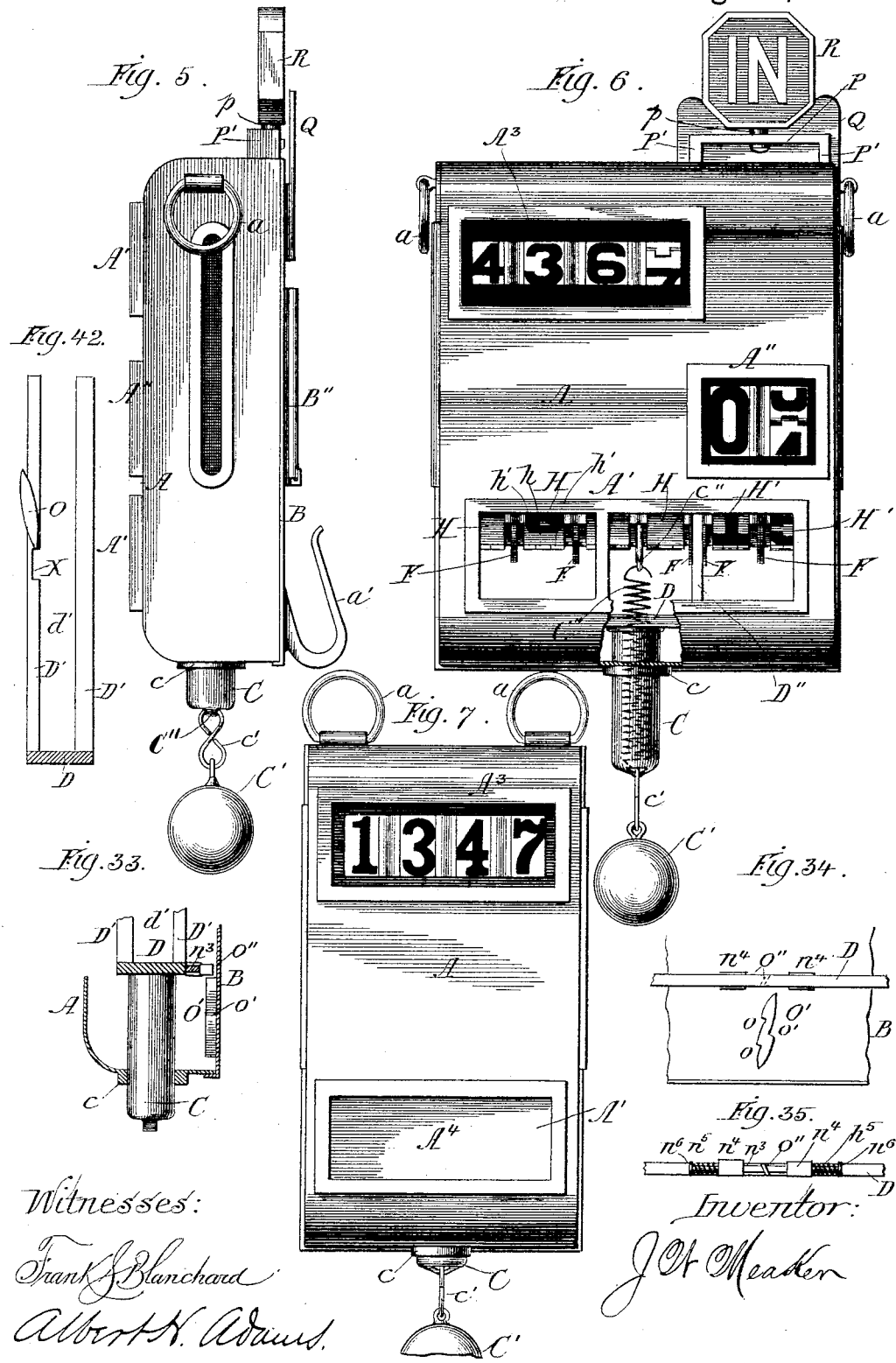

(No Model.) 6 Sheets—Sheet 3.

J. W. MEAKER.
FARE REGISTER.

No. 347,437. Patented Aug. 17, 1886.

Witnesses:
Frank J. Blanchard
Albert N. Adams

Inventor:
J. W. Meaker (No Model.) 6 Sheets—Sheet 4.

J. W. MEAKER.
FARE REGISTER.

No. 347,437. Patented Aug. 17, 1886.

Witnesses:
Frank J. Blanchard
Albert N. Adams

Inventor:
J. W. Meaker (No Model.) 6 Sheets—Sheet 5.
J. W. MEAKER.
FARE REGISTER.
No. 347,437. Patented Aug. 17, 1886.
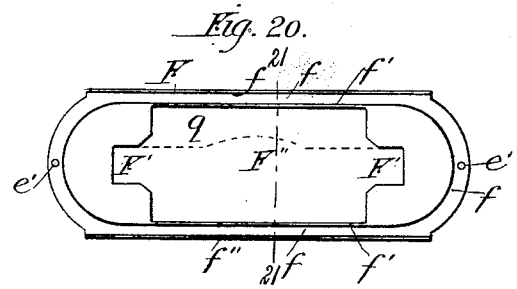
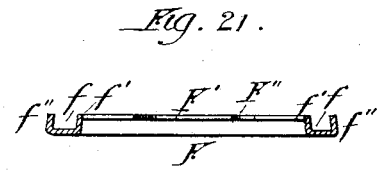
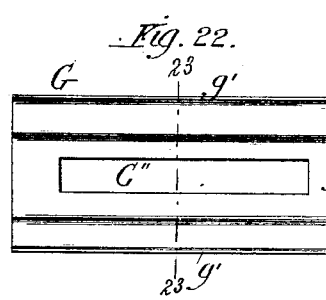
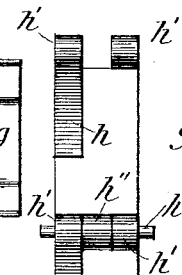
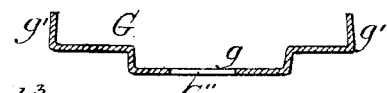
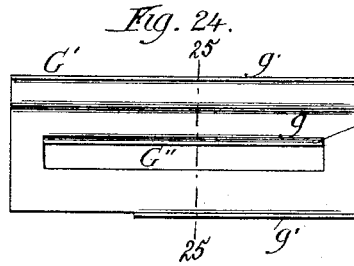
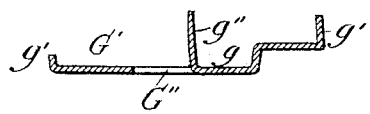
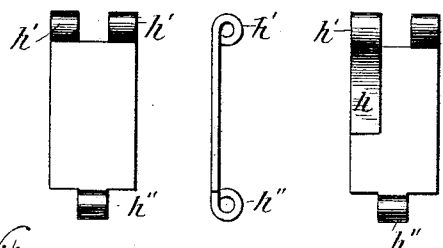
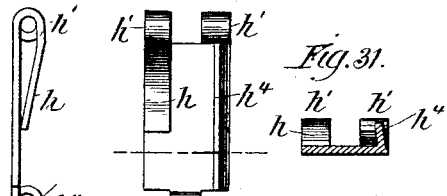
Witnesses:
Frank S. Blanchard
Albert N. Adams
Inventor:
J. W. Meaker (No Model.)  6 Sheets—Sheet 6.
J. W. MEAKER.
FARE REGISTER.
No. 347,437.  Patented Aug. 17, 1886.
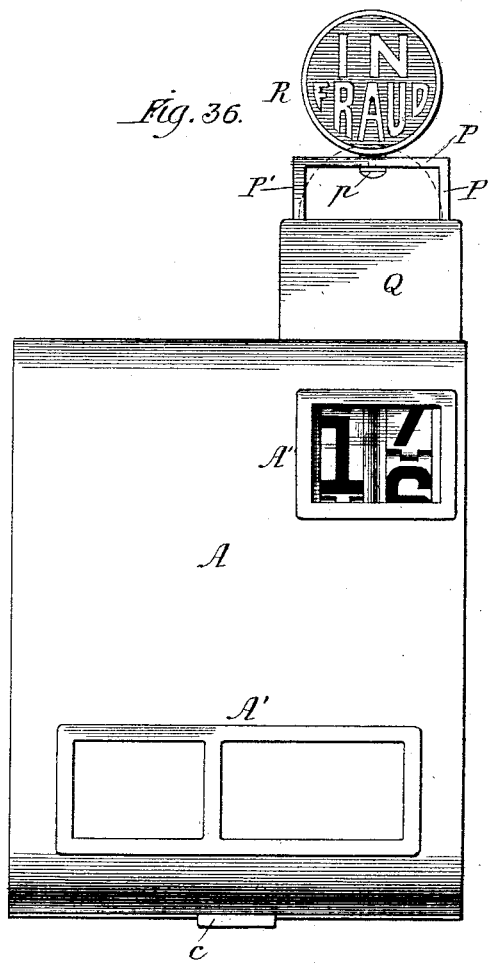
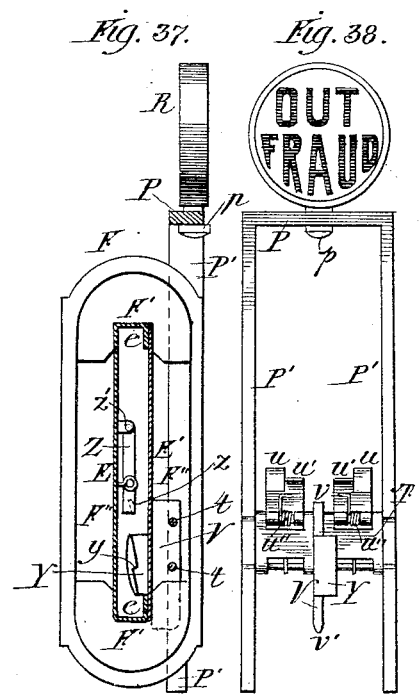
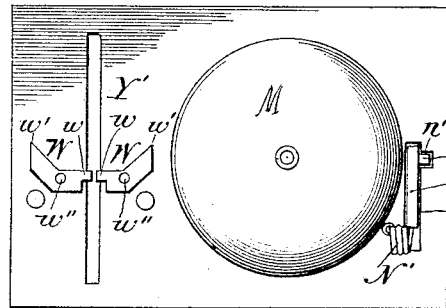
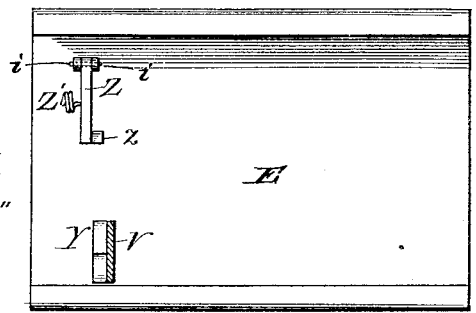
Witnesses:
Frank J. Blanchard
Albert H. Adams
Inventor:
J. W. Meaker

UNITED STATES PATENT OFFICE.

JOHN W. MEAKER, OF CHICAGO, ILLINOIS, ASSIGNOR TO THE RAILWAY REGISTER COMPANY, OF SAME PLACE.

FARE-REGISTER.

SPECIFICATION forming part of Letters Patent No. 347,437, dated August 17, 1886.

Application filed January 18, 1886. Serial No. 189,013. (No model.)

*To all whom it may concern:*

Be it known that I, JOHN W. MEAKER, residing at Chicago, in the county of Cook and State of Illinois, and a citizen of the United States, have invented certain new and useful Improvements in Fare-Registers, of which the following is a full description, reference being had to the accompanying drawings, in which—

Figure 8:
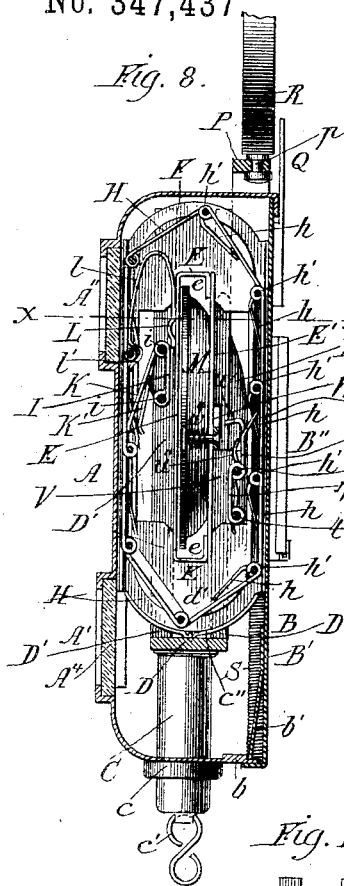
Figure 9:
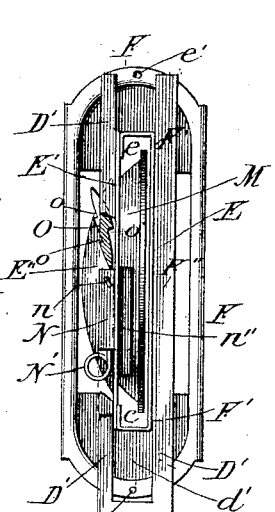
Figure 10:
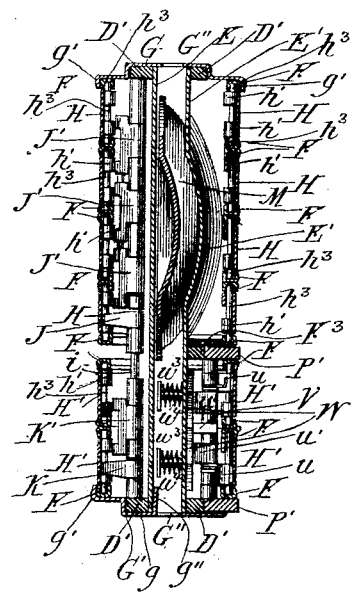
Figure 11:
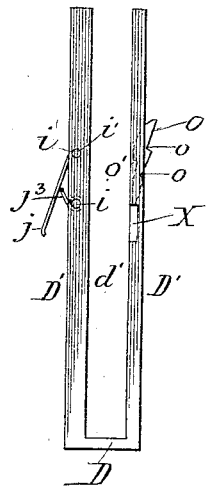
Figure 12:
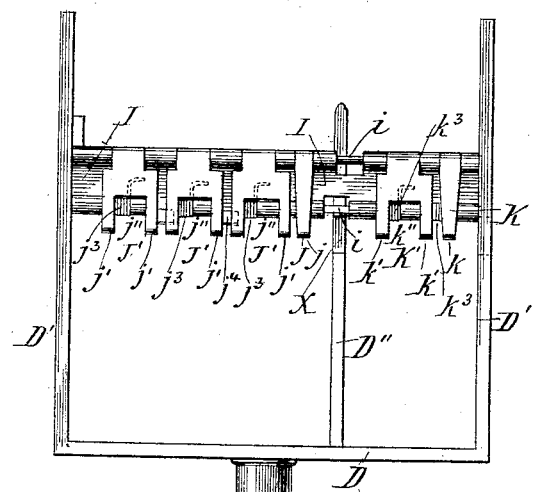
Figures 18, 19:
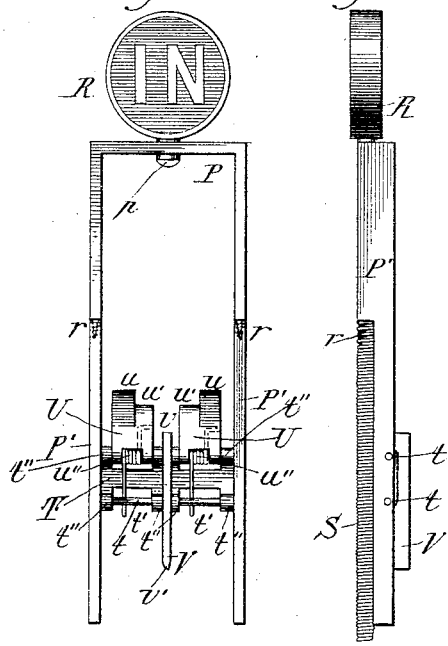
Figure 17:
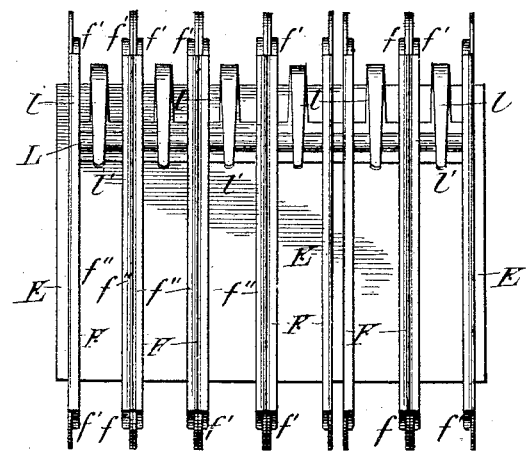
Figure 16:
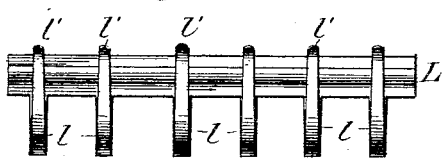
Figure 15:
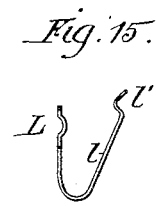
Figure 13:
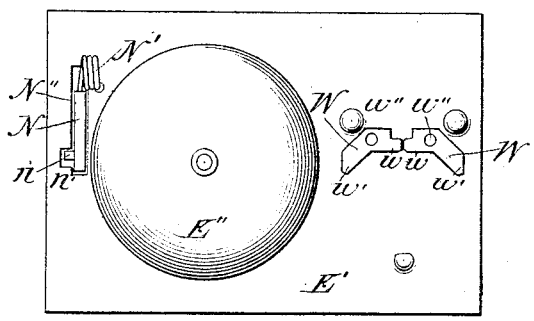
Figure 14:
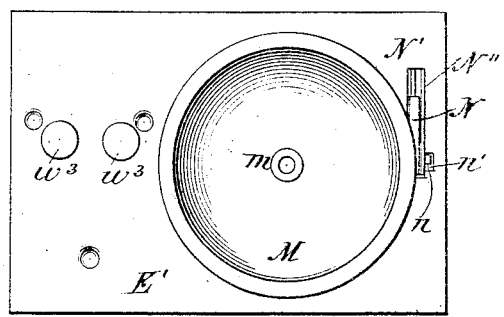

Figure 1 is a front elevation showing a casing to display only the numerals of the trip-register; Fig. 2, a rear elevation with the cover or back removed; Fig. 3, a rear elevation with the cover or back in place; Fig. 4, a detail showing the key for unlocking the cover or slide which conceals the numerals of the total register; Fig. 5, a side elevation; Fig. 6, a front elevation showing an arrangement of case for displaying both the numerals of the trip and the total registers; Fig. 7, a front elevation showing a total-register only; Fig. 8, a longitudinal cross-section; Fig. 9, an end elevation, partly broken away, of the support for the register-chains, the bell, and the devices for striking the bell; Fig. 10, a cross-section on line X X of Fig. 8; Fig. 11, a detail showing that side of the pull which carries the cam for operating the hammer of the bell; Fig. 12, a detail showing the pull and the dogs for actuating the chains; Fig. 13, a detail showing the bell and its carrying-plate; Fig. 14, a detail showing the opposite side of the plate carrying the bell from that shown in Fig. 13; Fig. 15, a detail, being an end elevation of the friction-stop for the chains; Fig. 16, a detail, being a side elevation of the stop for engaging the chains; Fig. 17, a detail, being a side elevation of the track or support for the chains, showing also the friction-stops for the chains; Fig. 18, an edge elevation of the pull for resetting the trip-register; Fig. 19, a side elevation of the devices shown in Fig. 18; Fig. 20, a detail, being a side elevation of one of the pieces for the track or support for the chains; Fig. 21, a cross-section on the line 21 21 of the piece shown in Fig. 20; Fig. 22, a side elevation of one of the end locking-pieces; Fig. 23, a cross-section on the line 23 23 of the piece shown in Fig. 22; Fig. 24, an elevation of the other end locking-piece; Fig. 25, a cross-section on the line 25 25 of the piece shown in Fig. 24; Figs. 26 and 27, details, being a side elevation and an edge view of the plain chain-link; Figs. 28 and 29, details, being a side elevation and an edge view of the chain-links having a bridge or track for riding the actuating dog or pawl; Figs. 30 and 31, details, being a side elevation and a cross-section of the link of the trip-register chains over which the dogs ride; Fig. 32, a detail of the locking-strip for holding the rods which carry the frame of the resetting-dogs in position; Fig. 33, a detail, partly in section, showing the lock or catch for the main pull attached to the casing in line with the stem; Fig. 34, a detail of the devices shown in Fig. 33; Fig. 35, a top or plan view of the devices shown in Fig. 34; Fig. 36, a front elevation showing the trip-register when not fully reset; Fig. 37, a sectional elevation showing the lock for the resetting-pull; Fig. 38, an elevation of the resetting-pull; Fig. 39, a side elevation showing the construction of bell-plate for use with the resetting-pull of Fig. 37; Fig. 40, a side elevation of the bell-case, showing the lock-stop for the resetting-pull; Fig. 41, a detail of a chain; Fig. 42, a detail showing the cam for operating the bell-hammer when the stop is formed independent thereof.

This invention relates to that class of fare-registers in which are employed a series of chains, each link of each chain having thereon a display-numeral, and has for its objects to improve the construction and operation of the registering-chains both for the trip and total registers when used; to improve the pull and the dog by which the registering-chains are advanced; to improve the devices by which the chains of the trip-register are reset and the direction of the run indicated; to improve the devices by which the alarm is sounded; to improve the devices by which a ringing of the bell is prevented from a partial pull of the actuating mechanism; to improve the devices by which the total-register is locked against non-action; to improve the devices and prevent tampering with the trip or total register in resetting; and to improve generally the construction and operation of the registering mechanism as a whole; and its nature consists in the several parts and combinations of parts hereinafter described and pointed out in the claims as new.

In the drawings, A represents a shell or case for containing the registering mechanism. As shown in Figs. 1, 2, 3, 5, and 6, this case is adapted to receive both a trip and a total register, and, as shown in Figs. 1, 6, 8, and 36, the registration of the trip-register is displayed through an opening, A″, formed in the case, while the total-register has the opening A³, through which it can be observed in the rear face of the case and covered by a locked slide. As shown in Fig. 6, the registration of the trip-register is displayed through an opening, A″, in the front of the case, and the registration of the total-register is displayed through an opening, A³, in the front of the case, Fig. 6 showing the position of the units-chains of the trip and total-registers on a partial pull. The case shown in Fig. 7 receives only the total-register, the registration of which is displayed through an opening, A³, in front of the case. The case in each instance is provided with an opening, A′, to receive a seal, A⁴, to prevent tampering with the inclosed devices, the opening, when the seal is broken, also allowing access to be had to the locking device of the cover or back, so that such cover or back can be removed for the purpose of repairing the registering mechanism, or for resetting the register, when necessary. As shown, the case is provided with rings $a$, to receive a strap to hang the same around the neck of the user, and the back of the case is provided with a hook, $a'$, to enter a button-hole of the wearer of the register and hold the register against outward swing in case of stooping, and against side swing or jerks when the wearer makes any sudden movement. The rings $a$ can be applied to the sides of the case for a combined trip and total register, using a resetting device for the trip-register, or to the top of the case for a total-register, as shown in the drawings.

B is a cover or slide forming the back of the case in the form of construction shown, the cover or slide having its side edges provided with a groove to receive a flange on the side of the shell or case A, and, as shown, the lower end of the cover or slide on its inner face is provided with a plate, B′, having a series of spring-fingers, $b$, as shown in Fig. 8, which spring inward, resting, as shown, at their free ends against a stop, $b$, on the end of the case or shell A, and abutting against the inner face of the end wall of such case or shell, (see Fig. 8,) so as to lock the slide or cover B firmly against withdrawal until the fingers $b'$ are pushed down so as to pass through the opening left therefor between the edge of the end wall and the inner face of the cover, and such release of the spring-fingers is accomplished by breaking the seal in the opening A′, and using a plate or key of the proper shape to force the fingers down.

The slide or cover B having a display-opening therein for the total-register, has such opening covered by a cover or slide, B″, which is locked against withdrawal by an arrangement of spring-fingers, on the same principle as the cover or slide B, and, as shown in Fig. 3, this cover has a series of holes, $b''$, through which studs $b^3$ on a plate or key, B³, Fig. 4, pass to engage the spring-fingers, and release them so as to allow the slide or cover B″ to be withdrawn to inspect the registration.

The shell or case and the slide or cover herein shown are to be made the subject-matter of another application, to be filed herewith, and are only here represented and described for the purpose of showing the registering mechanism in connection with an inclosing case or shell.

C represents a hollow stem, to which is connected by a link, $c'$, in the arrangement shown a knob or ball, C′, to be grasped by the user of the device in operating the register, and, as shown, this link $c'$ receives the end of a spring, C″, inclosed in the hollow stem C, and, as shown, the end wall of the shell or case A, at the point where the stem C passes through it, is thickened, so as to form a ring or bead, $c$, to furnish a guide for the stem in moving in and out.

D is a cross-bar, to which is firmly secured in any suitable manner the inner end of the stem C, and, as shown, the inner end of the spring C″ is connected to a wire, $c''$, attached to one of the plates F forming part of the frame of the registering-chains, as shown in Figs. 2, 6, and 8, so that the recoil of the spring C″ will return the bar D after each withdrawal by the stem C. Each end of the bar D is turned to form bars D′, standing at right angles to the bar D, and having between them a slot, $d'$, which allows the bars D′ to move with the cross-bar D. This device composed of the bars D D′ forms what is termed the "pull," by which the actuating devices of the register are operated, and such device is located within the case or shell, so as to have the cross-bar D in the space between the end wall of the shell and the end of the frame carrying the registering-chains, such space being of sufficient depth to allow the required movement of the pull to be had for actuating the mechanism.

D″ is a vertical bar, secured to the cross-bar D, and, together with one of the bars D, is provided with a slot, X, for a purpose hereinafter explained.

E is a plate, Figs. 8, 17, and 37, the side edges, $e$, of which are turned at right angles to the main or body portion and then at right angles to themselves, as shown in Fig. 8, and another side wall is furnished by a plate, E′, which plate is movable and carries the bell and its hammer. The shell formed by the plates E E′ is somewhat longer than the space required for the registering-chains, and the projecting ends of such shell enter the slots $d'$ in the respective side bars, D', of the pull and form a guide or track for maintaining the pull in a straight line of movement.

F are plates struck from sheet-brass or other suitable material to have at each end a rounded portion with straight parallel sides, as shown in Fig. 20. Each plate is depressed to form a continuous wall, $f'$, around its sides and ends, and each side of each plate is turned to form a wall, $f''$, between which and the side wall, $f'$, is formed a channel, $f$, and these plates F form the support and guides for the traveling chains. The support or guide for each end is formed of a single plate F, while the intermediate support or guides are formed by bringing two plates F back to back, and brazing, soldering, or otherwise securing them together, as shown in Figs. 10 and 17. Each plate F at its center has an opening, $F'''$, at each end of which is a slot, F', somewhat wider than the width of the plate E with its turned sides $e$, so as to leave between the side wall of F' and the turned end $e$ a space of the required width for the passage of the edge of the plate E', and the space F''', between the edges of F and the plate E, is of sufficient depth for the passage of the plate.

G is a guard-plate, of sheet-brass or other suitable material, formed as shown in Figs. 22 and 23, the turned edges $g'$ fitting over the turned edge $f''$ of the end guide or support F, and the depressed portion $g$ with the slot $G''$ passing over the projecting end of the frame or case E E', and forming, in connection with such end, the guideway for the bars D' of the pull, and, as shown, the slot $G''$ is of a less length than the opening in the frame or shell E E', so that the plate G also forms a guard against end withdrawal or movement of the sliding plate E'.

G' is a guard-plate, made of sheet-brass or other suitable material, for the opposite end of the frame carrying the registering-chains, and of the form shown in Figs. 24 and 25. This plate, instead of having its center depressed corresponding to the plate G, is depressed on one side only, the other side being left plain and smooth for the passage of the side-pull bar by which the trip-register is reset, and in order to provide a guideway for one side bar of the main pull with this plate the metal (which is cut out clear for the slot $G''$ of the plate G) is in plate G' left attached at one side and turned to form a flange, $g''$, between which and the wall of the depressed portion $g$ is a guide-space for one of the bars D', and this turned flange $g''$ enters the opening in the frame or shell E E'.

H represents the chains for the total-register, and H' the chains for the trip-register. Each chain is formed of a series of ten links, the sight-face of each link having thereon a numeral, the numerals running from 0 to 9, both inclusive, and the links of each chain are similar in construction, except for the last chain, which may be formed entirely of plain links on their inner faces. The other chains of the total-register have nine links, with bridges or cams $h$, (shown in Figs. 8, 28, 29, 30, 31, and 41,) such bridges or cams being formed by extending the metal of the eye $h'$ for the hinge on one side in the form of construction shown, but could be formed of a solid piece, soldered or otherwise secured in any suitable manner to the face of the link. Each link has at one end two eyes, $h'$, and at the other end a single eye, $h''$, to fit into the space between the eyes $h'$, and the links are connected together by passing a pin, $h^3$, through the opening in the eyes $h'$ $h''$, the end of the pin projecting beyond the side of the link to enter the groove $f$ in the guide-plate F. The remaining or tenth link of each complete chain is left plain—that is, the bridge or cam $h$ is omitted—and such link is provided only with the eyes $h'$ $h''$, for connecting it with the other links, and for the last chain of the total-register the links may be of the form shown in Figs. 26 and 27, as such chain does not have to register any movement with a following chain, its movement registering only with the preceding chain, and where movement of this kind only is required the bridge or cam $h$ is not necessary. The chains H' for the trip-register are also made up each of ten links, the display-face of each link having thereon a numeral, the numerals running from 0 to 9, both inclusive, and the units-chain is provided with a bridge or cam, $h$, for nine links, and with eyes $h'$ $h''$ to form the hinge in connection with a pin, $h^3$, the remaining link being left plain or smooth, similar to the link shown in Figs. 26 and 27, and the links for the tens-chain of the trip-register can be made entirely of smooth links, similar to that shown in Figs. 26 and 27, so far as concerns the advancing of the chains; but in order to reset the trip-register one link of each chain is to be provided with a bridge, $h^4$, which runs the entire length of the link, and by which the dog which resets the chain will be held from engagement, maintaining the chain so as to display the 0, as hereinafter described. This bridge $h^4$ has no coaction with the bridges $h$ of the units-chain, nor with the dog for advancing the chain, but coacts with the dog for resetting purposes.

I is a pull-support, made of sheet metal or other suitable material, and, as shown, having its edges cut out to leave openings, and also turned to form eyes, through which rods or wires $i$, one on each side, pass, the ends of the rods or wires entering holes $i'$ in one of the bars D' on each side, connecting the support I with the pull, so as to move therewith, and at the same time holding it against turning.

J is the dog or pawl for actuating the units-chain of the total-register, pivoted at its attached end to one of the rods $i$, so that its free end $j$ will engage with the hinge of each link and with each downward pull advance the units-chain a distance equal to the length of a link. This dog is formed of a single piece, and is independent of the other dogs, J', which actuate the remaining chains of the total-register, and these dogs J' are each pivoted at their attached ends to the rod or wire $i$, and their free or acting end $j'$ is made in two engaging ends with a slot, $j''$, between them, which slot straddles the support F, so that one pawl or arm can engage with the hinge of the units-chain and the other with the hinge of the tens-chain for the pawl adjacent to the pawl J, while the pawl adjacent to the first pawl J' has one arm to engage the tens-chain and another to engage the hundreds, and the pawl adjacent to it has an arm to engage the hundreds, and one to engage the thousands, and so on for the number of chains used. One end, $j'$, of the pawl J' adjacent to the pawl J comes in contact with the bridges $h$ on the units-chain, so that such pawl cannot drop into engagement with the hinge of either the units or tens chains until the link having no bridge is reached, when the pawl J and the first pawl J' act in unison to advance both the units and the tens chains simultaneously at each complete revolution of the units-chain, and when the tens-chain has made one complete revolution the dog or pawl J', which has been held up by the bridges $h$ of the tens-chain, is made to engage with the hinge of the units and tens chains and advance all three of the chains, and so on for the full number of chains. As shown, the acting end of each dog or pawl is thrown out by a spring, $j^3$, coiled around a rod or wire, $i$, on the opposite side of the frame I from the rod or wire to which the dogs are hinged, each spring having an arm to lie beneath the pawl or dog to throw the same out, and in order to prevent the third dog from jumping ten numbers a lip or catch, $j^4$, is provided, and a similar lip or stop is provided for the fourth dog, and such a lip or stop is provided for each chain after the fourth, if more chains are used. This stop or catch $j^4$ is required for the reason that the chains at the first start of the register all stand at 0, which would bring the third chain nine numbers in advance of where it actually belongs, and which it would advance with the advance of the tens-chain were it not for the lip or catch $j^4$, which prevents such advance until required.

K is the dog for the units-chain of the trip-register, similar in construction and arrangement to the dog J of the total-register, and K' is the dog for the tens-chain of the trip-register, similar in construction and arrangement to the dog J' of the total-register. The acting ends $k$ $k'$ of the dogs K K' engage the chains of the trip-register at the hinge or joint of the links, the units-chain having bridges $h$ for the end $k'$ adjacent to the pawl K to ride over until the non-bridged link is reached, and the dogs are thrown out by springs $k^3$, similar to the springs $j^3$, and as in the arrangement shown only two chains are provided for the trip-register, the dog K does not require a stop or catch, $j^4$. The dogs J J' K K' are carried by the same frame or support I, and hinged by the same rod $i$, so that their acting ends project or stand in the same general direction to engage the respective chains with which they co-operate.

L is a plate having thereon a series of spring-arms, $l$, which terminate in a hook, $l'$, the depression in each hook being of a form to receive the hinges of the chains, a spring-arm, $l$, being provided for each chain, and these spring-arms act as a friction-stop to hold the chain against movement, except through the action of the pull and the actuating-pawls. This plate L, with its spring-arms $l$, is soldered or otherwise secured to the plate E so as to have the catches $l'$ of the spring-arm properly line with the hinges of the links to receive such hinges, as shown in Fig. 8, the catch operating on the chains on the opposite end of the pawls.

M is the bell, located in a depression formed therefor in the plate E', and held in position by a rivet, $m$, or otherwise, the edge of the bell projecting beyond the face of the plate sufficiently far to be struck by the hammer, and the bell standing clear of the depression in which it is located.

N is the hammer for striking the bell, carried by a coiled spring, N', and located in a slot, N'', cut in the plate E', the spring carrying the hammer being soldered or otherwise firmly secured to the plate, and this hammer at its free end on one side is provided with a projection, $n$, by which it is actuated from the operating-cam, the slot N'' having a side opening, $n'$, for the passage of the projection $n$ in striking the bell.

O is the cam for operating the hammer of the bell. This cam is attached to one of the bars D', so as to project beyond the edge of the bar, as shown in Fig. 11, and its projecting side is provided with notches or recesses $o$, into which the stop $n$ can pass, and by which the hammer is locked against striking, with only a partial movement of the pull, and which also forms a lock against the return of the pull until a complete movement has been made for the stop $n$ to pass over the end of the cam, allowing the hammer to be thrown down by the spring to strike the bell, and the inner face of this cam O is provided with a recess, $o'$, to prevent ringing in case the pull is not allowed to return to its full stroke, for which purpose the stop $n$ engages the notch $o'$, and prevents a downward pull from a half-return of the pull.

P is a cross-bar having at each end side bars, P', and forming a pull for resetting the trip-register.

Q is a stop-plate, secured to the slide or back B in line with the pull P.

R is a thumb-piece, pivotally connected by a suitable pin or pivot, $p$, to the cross-bar P, so as to be free to turn. This thumb-piece on one side has the word "IN," and on the opposite side the word "OUT," so that by withdrawing the pull sufficiently far for the disk or thumb-piece R to clear the stop-plate Q, such disk or thumb-piece can be turned to have either the word "IN" or "OUT" at the front, as may be desired, for indicating the direction of travel.

S (see Figs. 2 and 18) denotes springs, one for each side bar P', to which the spring is attached by screwing it onto a screw, $r$, on a shoulder of the side bar, as shown in Figs. 18 and 19, and its other end is attached to the end wall of the case A by a screw $s$, as shown in Fig. 2.

T is a plate, Fig. 19, the edges of which are provided with recesses $t'$ and ears $t''$, through which ears rods or wires $t$ pass, connecting the plate or support T with the side bars, P', so that such plate will move with the bars and will be held against turning, the wires $t$ entering holes in the side bars, as shown in Fig. 18.

U represents resetting dogs or pawls, each pivoted to one of the wires $t$ of the support T, and having its acting end provided with a part, $u$, to engage the hinge of the chain, and with a part, $u'$, the end of which stands at an angle to the body portion to rest upon the bridge $h^4$, and hold the pawl from engagement with the hinge, so that the movement of the pull P P' will not advance the chain, and the relation of the bridge $h^4$ is one that will allow the pawls U to advance the trip-register chains until the 0 is in view, when the link having the straight-faced bridge $h^4$ thereon is in position for the part $u'$ to ride over with the movement of the pull and hold the pawl out of engagement, thereby preventing further advance of the chains. The pawls U are thrown into engagement by a spring, $u''$, coiled around the rod or wire to which the pawls are pivoted, and, as shown, the pivoted end of the pawl is slotted for the coiled spring, and one arm of this spring passes beneath the pawl and the other beneath the wire $t$ on the opposite side. (See Fig. 19.)

V is a bar secured to the support T by passing the rods or wires $t$ through it, and having one of its ends, $v'$, somewhat pointed.

W represents dogs located on the outer face of the plate E', and pivotally attached to the plate by suitable pins or pivots, $w''$. Each dog W has an end, $w$, and an end, $w'$, the ends $w$ lying in contact, or nearly so, when the dogs are in the position shown in Fig. 14, and these ends are in line with the movement of the bar V, so that the end $v$ will strike between them and throw the ends $w$ apart. The pins or pivots $w''$ pass through the plate E', and are provided each with a head, $w^3$, between which and the face of the plate around the pin is located a coiled spring, $w^4$, Fig. 10, by which a proper tension is applied to the dogs W to allow them to be turned readily by the bar V, and at the same time compensate for wear and prevent displacement by jarring.

X represents slots in the inner edge of one of the bars D' and the bar D'', Fig. 12, and so located in relation to the movement of the pull and the dogs W that when the pull is at rest the notches are in line to have the ends $w'$ of the dogs thrown into engagement therewith as the dogs are opened by the bar V, thereby locking the main pull against withdrawal until the engagement of the dogs W with the notches X is released.

The parts forming the registering mechanism are assembled or put together in the following manner: The guide-plates F are secured to the shell or support E by slipping them onto such shell and brazing or otherwise securing them firmly in position to leave the required space between them for the chains, as shown in Fig. 17, the end plate in each instance being a single one, and the intermediate ones two plates placed back to back. The bar L, with the spring-arms $i$, is placed in position and secured to the support E in any firm manner to have the spring-arms lie midway of the spaces between the guide-plates F and the hook ends $l'$, in proper relation to receive the hinge of the chain-links. The chains are placed in position in the spaces between the supports by leaving a disconnection between two of the links and drawing the chain around and bringing the disconnected ends in line to pass the pivoted pin $h^3$ therefor through the hole $e'$, formed in the end of the guide for this purpose. The plate E', with the bell and the dogs W thereon, is slipped into position to have the bell lie within the shell formed by the plates E E' and the dogs W in line with the movement of the bar V. The plate I, with the pawls J' J'' K' K'' thereon, is slipped into place between the plate E and the edge of the guide-plates F in the space F'. The side bars, D', are slipped into position to straddle the projecting ends of the shell or case E E' and to receive the rods or wires $i$, which connect the plate I with the pull, and that arm or bar D' of the pull which carries the cam O lies on the end adjacent to the hammer N, so as to have the cam O engage the projection $n$ to operate the hammer. The plate T, carrying the resetting-dogs U, is slipped into the space F' to have the bar V come directly beneath the double guide-plate F of the trip-chains, and the bars P' of the resetting-pull are slipped into place to have one arm lie between the end guide-plate F of the total-register and the inner guide-plate F of the trip-register, with the other arm outside of the end plate of the trip-register, the bars P' lying one over one of the bars D' and the other over the bar D'' of the main pull, as shown in Fig. 10, and the connection between the plate T and the bars P' is completed by entering the rods or wires $t$ into the holes therefor in the bars P'. The end plates, G G', are then slipped over the ends of the device, the plate G' being on that end not having the cam O on the pull, and the plate G on the end having the cam O.

The chains H of the total-register are all set to have the 0 in sight, and the chains H' of the trip-register may also be so set, or they can be set to 0 after the parts are inclosed in the case, and when the chains of the total-register are at 0 and the parts assembled together, as described, the registering mechanism is placed in the shell or case A, and the springs S, which have been attached at one end to the screws $r$ of the resetting-pull, are connected to the end wall of the shell by the screws $s$. The spring C″ is attached at one end to the wire $c''$, the other end and the body of the spring entering the hollow stem C, which is passed up through the hole in the case and its end firmly secured to the cross-bar D of the pull, and the other end of the spring is secured in the stem C, by attaching it to the hook or link $c'$. The seal is then secured in place, and the slide or cover B is now placed in position on the back and locked by the engagement of the spring-fingers $b'$, with the inner face of the end plate, when the register is ready for use.

The foregoing assemblage of the parts relates to a register having thereon a trip-register. For a total-register only the parts are assembled in the same manner, except that the guide-plates for the trip-chains, the trip-chains, the resetting-pull, and devices pertaining to the trip, are omitted, the register as a whole being foreshortened to that extent.

It is to be understood that before the back is slipped into place and locked the register is to be examined by the proper officer to see that the noughts are in line and presented, after which a seal is to be inserted at the opening therefor, so that when the slide or cover B is in position access cannot be had to the registering devices until the seal is broken. This seal A⁴ may be a paper, properly identified by some officer of the company, and a number, protected by a glass or other transparent medium, as usual.

In use the register is carried by the conductor, or other party, through the medium of a strap passing around the neck of the wearer and receiving the rings $a$, and by inserting the hook $a'$ in a button-hole, or other opening, which secures the register in place and prevents swinging thereof. The register is operated by taking hold of the ball or knob C' and pulling thereon, to withdraw the stem C and with it the pull D D'. The withdrawal of the pull carries with it the support I, advancing the pawls J J' and K K', and on such advance for nine pulls the dogs or pawls J K are the only ones that act, because the other pawls, J' and K', are held out of engagement by the bridges $h$ on the chains. At the tenth pull the link of the units-chain, having thereon no bridge, allows the pawl of the tens-chain to drop down so that one arm of such pawl engages the units-chain and the other the tens-chain, thereby advancing both the units and tens-chains simultaneously, bringing in view the figure 1 on the tens-chain and the 0 on the units-chain, displaying 10 at the sight-opening. The next pull advances the units-chain only because the pawl for the tens-chain again is kept out of engagement by the bridges $h$ of the units-chain until the next tenth pull, when both chains are advanced, as before described, presenting to view the figure 20, and so on until the hundreds-chain is to be moved at the hundredth pull, at which time the plain links of the units and tens chain come in line, so that the pawls for these chains and the pawl for the hundreds-chain all drop into engagement with their respective chains, advancing the three chains simultaneously, presenting to view at the sight-opening the figure 100. The hundreds-chain remains inactive until another one hundred is to be registered, when the same operation occurs of the three pawls dropping into engagement to advance the three chains, and such operation continues for as many chains as may be used, the thousands-chains not being actuated until the preceding chains have registered 999. The chains are supposed at the start to each register a zero, and it will follow that if no means were provided to check the advance until the proper movement is reached the registration would be made incorrectly, and to prevent this the stops $j^4$ are provided on the dogs for the hundreds, the thousands, and the succeeding chains, if more are used, which stop provides a delay-space, causing a registration at the proper time.

It is found desirable with most street-railway companies to have a register that will denote the number of fares on a trip, and which will also indicate the direction in which the car is traveling. The trip-register is furnished with the chains H', actuated by the pawls K K' in unison with the chains of the total-register and in the same manner. At the end of the trip the total number of fares collected will be displayed on the trip-register chains, and such chains are reset through the pull P P', which pull, through the dogs or pawls U, advances the chains until the zero of each chain is in view, when the pawls ride over the bridge $h^4$, stopping further movement of the chains, so that no matter how much the pull may be worked thereafter the chains will not be advanced beyond the 0. The first operation of the pull causes the bar V to strike the dogs W and throw such pawls into engagement with the locking-notches X, and as the dogs W cannot enter these notches except when the main pull is entirely in, an effectual guard is provided against resetting the trip-register until the main pull on the total-register has been actuated, and each movement of the resetting-pull locks and unlocks the dogs, so that no operation of the total-register pull can be made without indicating the fact. The resetting-pull can be withdrawn and the finger piece or button R turned to present the words "IN" or "OUT," to indicate the direction of the travel, and such turning of the thumb piece or button can only be accomplished by the withdrawal of the pull, as the stop-plate Q prevents turning except when the thumb piece or button is clear of such stop-plate. As shown, bumpers $d$, of rubber or other elastic material, are located on the cross-bar D, to prevent injurious effects from the return of the pull in case it is released suddenly. Such bumpers, however, are not absolutely necessary.

As shown, a guard, $n''$, Fig. 9, is formed by turning down the portion of the metal which forms the slot $N''$, and this guard $n''$ is for the purpose of preventing tampering with the alarm, by making a small hole in the casing, through which a wire or other device could be inserted and the bell rung without operating the pull.

The stop for preventing an alarm and return of the main pull, unless the full limit of the pull is made instead of being formed with the cam O, which operates the hammer of the bell, could be an independent piece suitably secured at some other point, and such a stop, O', is shown attached to the inner face of the cover or back B in Figs. 33, 34, and 35. This stop O' is located in line, or nearly so, with the center of the stem C, and is provided on one edge with notches $o$ and on the opposite edge with a notch, $o'$, the notches $o$ preventing the return until the complete limit of the pull downward is reached, and the notch $o'$ preventing a pull downward until the limit of upward movement is reached, and with this stop O' a catch or projection, $o''$, operates such catch, being located on a sliding bar, $n^3$, Fig. 35, mounted in guides $N^4$ on the edge of the cross-bar D, and, as shown, between the guides $n^4$ and ears $n^6$, around each end of the sliding-bar is a coiled spring, $n^5$, by means of which $o''$ is maintained in a central posion, but is free to move in either direction by contact with the edges of the stop O', so that on the downward pull the catch $o''$ will pass into the notches $o$, and prevent any return of the pull until the end of the stop O' has been passed, and on the return this catch $o''$ will engage the notch $o'$, and prevent a downward pull until the end of the stop O' has been passed, and with this construction the cam O for ringing the bell can be formed with smooth edges, so as to present no obstruction, the stoppage being by means of the stop O' and the catch $o''$.

The pins $t$ for the support T, are locked against end movement, when the pull is in place, by inserting a plate, $q$, Fig. 32, between the side of the inner pull-bar P' and the adjacent guide-plate F, the other end of the pin being locked by the plate G' and the rods $i$, for the frame or support I are locked against end movement by the plates G G'.

It is to be understood that it is not absolutely necessary to have the total-register start with all the chains at zero, as the operation will continue irrespective of the position at which the chains are started—that is to say, each advance chain will not be operated until the preceding chain has completed the required number of steps for a registration of ten.

The resetting-pull can be locked against false movements, if so desired, by means of a suitable stop, and an arrangement of stops for this purpose is shown in Figs. 37, 38, 39, and 40, in which Y represents a stop formed by a projecting piece extending out from the piece V, one face of which is rounded or curved, and the other face is provided with a notch, $y$, and Z a bar pivoted at one end to ears $z'$, on the inner face of the plate E, Figs. 37 and 40, and having at its free end a catch, $z$, to engage the notch $y$ of the stop Y, and, as shown, this latch or bar Z is held in its normal position by a spring, Z', one end of which is connected with the latch and the other with the plate E, so that the latch at its free end is free to swing to or from the plate with the engagement of the stop Y. The operation of this lock for the resetting-pull will be readily understood, as on the advance of the pull the curved face will readily pass the catch $z$ of the latch Z, forcing the latch toward the plate E, and after the stop Y has passed the catch $z$, the spring Z' throws the end of the latch Z to its normal position, so that on the return of the pull the notched face of the stop Y will pass adjacent to the catch $z$, and unless the pull returns to its normal position when at rest it cannot be again advanced, as the notch $y$ will engage the catch $z$ and lock the pull, so that unless a complete movement of the pull is made the pull will be locked against the next advance, and in order to show that the register is being tampered with by the operator, the button R may, have in addition to the word "IN" or "OUT" on its faces, another word, such as "FRAUD," to indicate that the operator is not correctly working the register, such word being visible when the resetting-pull is not fully actuated, and its position for this purpose is shown in Fig. 36. The lock-stop can be arranged so that in case a full pull is not made the registering-chain will display the halves of two numbers instead of one full number, so that a person reading the register would at once observe that it was not being worked properly, and the resetting-pawls can be made to operate on the chains to advance them, so as to display on the resetting half-numbers instead of a full number, the full number being displayed when the main pull is actuated, so that any one reading the register would know that if half numbers were displayed the operator was resetting the register, while if a full number were displayed it would disclose that the operator was making the proper registration.

What I claim as new, and desire to secure by Letters Patent, is—

1. The shell or case E and plates F, in combination with the traveling register-chains, and forming a support and guide for said chains, substantially as specified.

2. The combination, with the shell or case E, end plates F, traveling register-chains, and actuating-pull, of the guard-plates G G', for furnishing a guideway for the actuating-pull, substantially as specified.

3. The pull D D', in combination with the shell or case E, plates F, and guard-plates G G', for securing the several parts together, substantially as specified.

4. A register-chain consisting of a series of links, each having a diplay-face for the numeral, and a bridge, $h$, and a plain link, in combination with dogs adapted to coact with said bridges, substantially as and for the purpose specified.

5. A chain for registering purposes formed of one plain link and numeral-links provided with bridges $h$, in combination with actuating-pawls J J', for advancing the chains, substantially as specified.

6. A chain for a trip-register, having therein a link provided with a bridge, $h^4$, links each having a bridge, $h$, and a plain link for advancing and resetting the chains, in combination with actuating mechanism, substantially as specified.

7. The combination, with the chains of a trip-register, of a resetting-pull consisting of pull-bars and pawls U, carried by the pull-bars, and operated substantially as set forth.

8. The combination, with the chains H, of an actuating-pawl, J', having a lip or projection, $j^4$, for holding the pawl in non-action until a movement of the chain which it operates is required, substantially as specified.

9. The combination, with the chains H, of the pawls J J', arranged and operating to advance the chains in succession, substantially as set forth.

10. The pull D D', and chains H, formed of links having bridges $h$ and a non-bridged link, in combination with the support I, and pawls J J', for actuating the links from the movement of the pull, substantially as specified.

11. The pull D D', frame or support E E', guides F, and plates G G', in combination with the chains H H', bar I, and pawls J J' and K K', for operating both a total and a trip register, substantially as specified.

12. The combination, with a series of registering-chains, of friction-stops $l\ l'$, substantially as and for the purpose specified.

13. The combination, with the pull D D', bell M, and hammer N, carried by a spring and having a projection or lip, $n$, of a cam, O, carried by the pull for sounding the bell, substantially as and for the purpose specified.

14. The combination, with the pull D D', and a hammer, N, for sounding a bell, of a cam carried by the pull for actuating the hammer, and provided with stop-notches $o\ o'$ for preventing the sounding of the bell except on a complete pull, substantially as specified.

15. The pull P P' and button or finger piece R, having indicating-marks thereon, in combination with the stop-plate Q for preventing a reversal of the button except on a full withdrawal of the pull, substantially as specified.

16. The pull P P carrying the pawls U, in combination with the registering-chains H', formed of links, and each having a link with a bridge, $h^4$, for resetting the chains, and preventing advance after the 0 is displayed, substantially as specified.

17. The bar V, in combination with the main pull and dogs W, for operating the dogs to lock and unlock the main pull, substantially as specified.

18. The pull P P', carrying the bar V, in combination with the main pull-dogs W and slots X in the main pull for locking and unlocking the main pull, substantially as described.

JOHN W. MEAKER.

Witnesses:
ALBERT H. ADAMS,
EDGAR T. BOND.